A. V. T. DAY.
HYDRAULIC POWER TRANSMISSION SYSTEM.
APPLICATION FILED JUNE 20, 1907.
956,570.
Patented May 3, 1910.
3 SHEETS—SHEET 1.
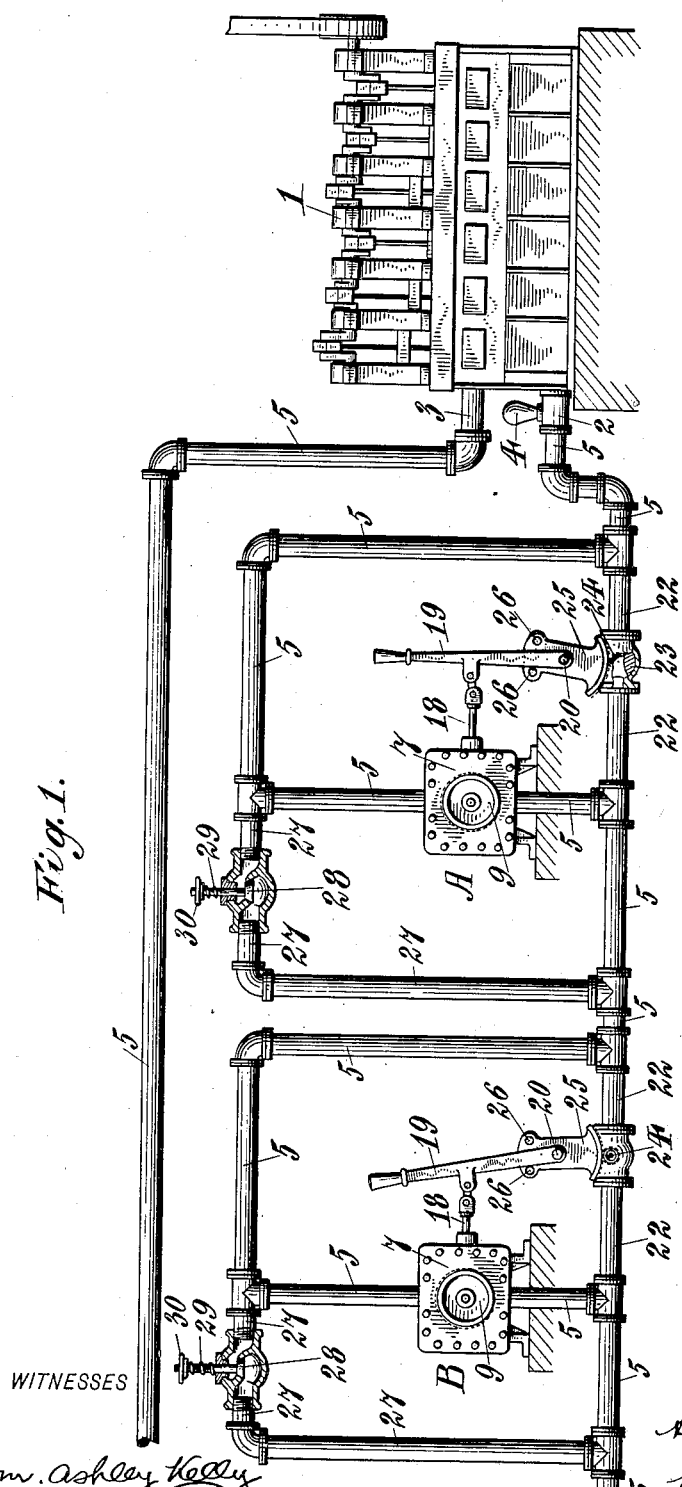

A. V. T. DAY.
HYDRAULIC POWER TRANSMISSION SYSTEM.
APPLICATION FILED JUNE 20, 1907.
956,570.
Patented May 3, 1910.
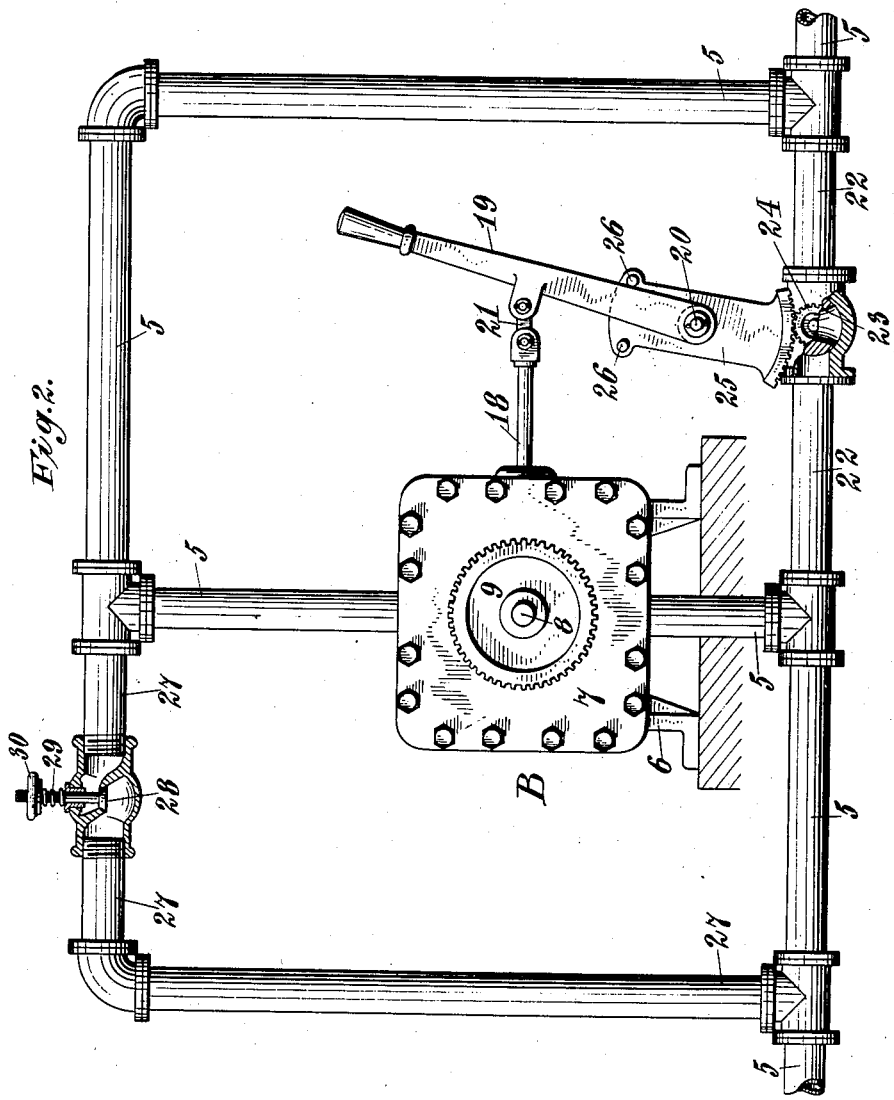

A. V. T. DAY.
HYDRAULIC POWER TRANSMISSION SYSTEM.
APPLICATION FILED JUNE 20, 1907.
956,570.
Patented May 3, 1910.
3 SHEETS—SHEET 3.
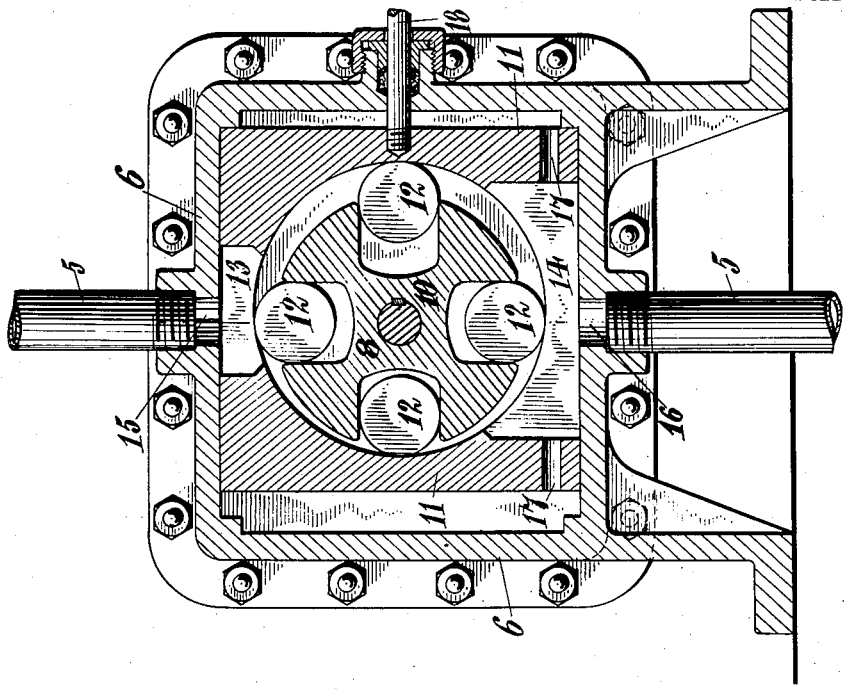
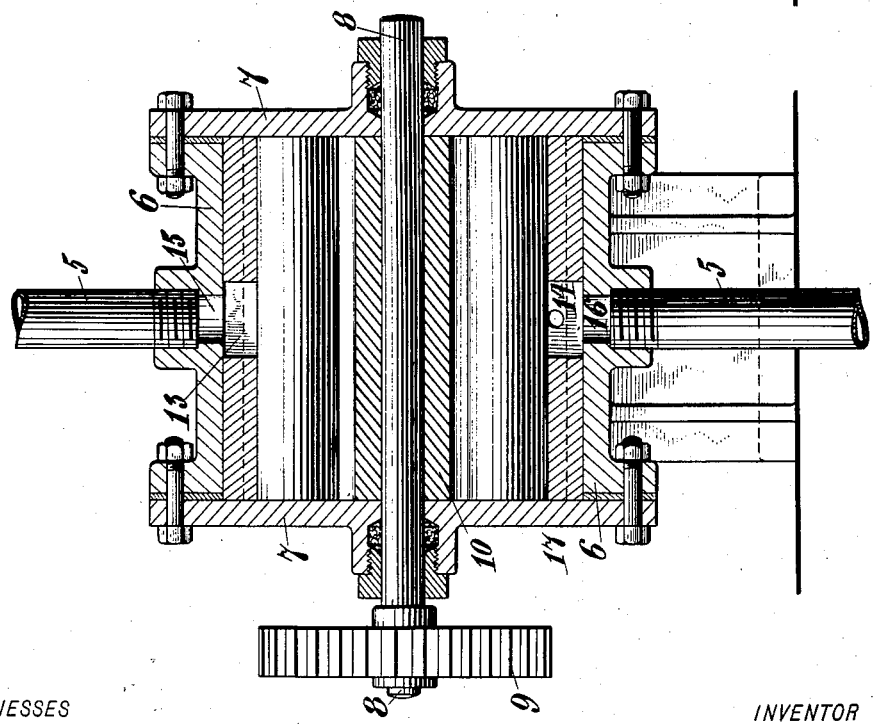
WITNESSES
INVENTOR
Albert V. T. Day
BY
Henry D. Williams
ATTORNEY

UNITED STATES PATENT OFFICE.

ALBERT V. T. DAY, OF NEW YORK, N. Y., ASSIGNOR TO CONRAD HUBERT, OF NEW YORK, N. Y.

HYDRAULIC POWER-TRANSMISSION SYSTEM.

956,570.  Specification of Letters Patent.  Patented May 3, 1910.

Application filed June 20, 1907. Serial No. 379,894.

*To all whom it may concern:*

Be it known that I, ALBERT V. T. DAY, a citizen of the United States, residing in the borough of Brooklyn, city of New York, in the county of Kings and State of New York, have invented a certain new and useful Improvement in Hydraulic Power-Transmission Systems, of which the following is a specification, reference being had therein to the accompanying drawings, forming a part thereof.

My invention relates to hydraulic power transmission systems or conduit circulatory systems in which a power transmitting liquid or motive liquid is circulated for distributing power from a central point to a multiplicity of points, and relates particularly to such systems when installed in factories or shops.

The general objects of my invention are simplicity, economy and efficiency.

A particular object is to secure a rigid system of power distribution having all the advantages of line shafting, including change of speed and reversal, with none of the disadvantages, such as cumbersomeness, clumsiness, bulkiness, noisiness, wastefulness of power, unadaptiveness, etc.

Other objects and advantages will appear from the following description.

My invention comprises a system in which a plurality of hydraulic motors are connected in series in a single liquid-carrying conduit, such conduit being included in a closed circulatory system through which power transmitting liquid is circulated at a substantially constant rate or volume of liquid per given interval of time, as, for example, by a constant delivery pump.

My invention also includes, in combination, means for circulating the power transmitting liquid at a constant rate.

My invention also includes means for operating each motor independently of and without interference with any of the others and for operating such motor at various speeds and in either direction of rotation.

My invention also includes safety means for preventing damage to the system in case one or more of the motors should for any cause while in operation become locked or stalled.

My invention also includes certain other features and details of construction which will appear from the following particular description of the construction embodying my invention which is shown in the accompanying drawings. I will now describe such construction and will thereafter point out my invention in claims.

Figure 1 is a diagrammatic elevation showing a closed conduit series circulatory system, including a constant delivery pump and a plurality of hydraulic motors of which two are shown, connected in series relation with each other and adapted to be independently operated and controlled. Fig. 2 is an enlarged elevation of one of the motors, and its controlling apparatus, illustrating a different phase of operation. Fig. 3 is a longitudinal central sectional elevation of the motor shown in Fig. 2 as viewed from the right. Fig. 4 is a transverse central sectional elevation of the motor as viewed from the front of Fig. 2 and from the left of Fig. 3.

My invention comprehends a system and does not depend upon a particular motor construction, it being only necessary that the motor shall be adapted to the requirements of the system. For example, the motors should be capable of consuming variable quantities of motive liquid, because in this system the flow of motive liquid is of constant volume in a given interval of time and it is desired to change the number of cycles or revolutions of the motor occurring in a given interval of time. To prevent injury to the system by the stalling of a motor, as, for example, from an excessive overload, an automatically acting shunt conduit or safety by-pass is provided around each motor. To permit free flow of motive liquid for operating some of the motors when others are shut down another shunt conduit or by-pass around each motor is provided and is arranged to be controlled in conjunction or concurrently with the control of the motor.

A constant delivery pump is provided for continuously driving or forcing the motive liquid with a constant volume in equal times through the liquid-carrying conduit. This pump may be of any well known construction, either rotary or reciprocating. Such a pump is diagrammatically shown as a six-cylinder reciprocating pump 1, the cranks of which are equiangularly disposed about the crank shaft as indicated by their positions. The pump should be operated at a constant rate of speed, and power may be supplied for this purpose from any suitable source, a pulley and belt being shown as the means for applying the driving power to the pump. The circulating pump 1 has an outlet at 2 and an inlet at 3. For equalizing the slight irregularities in delivery the pump is provided at its outlet 2 with a small air chamber 4. This air chamber is only just large enough to take care of such irregularities and is not of sufficient capacity to permit even the momentary cessation of the delivery of motive liquid from the pump through its outlet. The air-chamber merely assists in a well known manner, in producing a substantially constant delivery from the pump, but is so small as to preclude any cessation of delivery under any circumstances whatever. The conduit 5 for the circulation of the motive liquid or power transmitting liquid extends in a continuous loop from the outlet 2 of the circulating pump to the inlet 3 thereof, such conduit, however, being divided into sections between which are interposed the hydraulic motors proper, of which two A and B, are shown.

The hydraulic motors shown as employed in the system will now be described, and as these motors are all alike it is only necessary to particularly describe one of them.

The motor has a rectangular casing composed of a flanged lateral inclosure 6, formed with downward extensions as shown for a base or support for the motor, and the end pieces or motor heads 7 which form also cylinder heads. The lateral inclosure and the heads are joined with each other in a liquid-tight manner with interposed gaskets upon which they are drawn together by bolts as shown. A rotary motor shaft 8 passes centrally through the heads 7 and has its bearings therein made liquid-tight by packing glands as shown. The motor shaft carries a gear wheel 9 for connecting the motor to any tool or machine to be driven thereby. Within the casing a rotary piston 10 is concentrically fixed upon the motor shaft, being shown as keyed thereto, and fits closely at its ends between the heads 7. The piston core 10 has longitudinal channels or grooves as shown in which are seated cylindrical rollers 12 forming piston wings, the rollers being free to move radially in the grooves and, when the motor is in operation, being pressed outward by centrifugal force. The motor has a cylinder comprising a rectangular block 11 which completely surrounds the piston and slides with a close fit in the casing transversely to the axis of the piston. The cylinder has a bore of larger diameter than the piston core 10 such bore being shown as cylindrical. When the motor is in operation centrifugal force keeps the rollers 12 in contact with the inner surface of the cylinder. By sliding the cylinder laterally toward one side or the other of the casing, varying degrees of eccentricity between the cylinder and piston may be produced in either lateral direction, and by bringing the slidable cylinder to medial position a concentric relation of the cylinder and piston will be produced. The cylinder has an inlet port 13 and an outlet port 14 which are vertically diametrically opposite to each other and are of sufficient width to always communicate respectively with corresponding entrance and exit openings 15 and 16 regardless of the position of the cylinder. To permit reversal of piston rotation the inlet and outlet ports 13 and 14 extend equally in opposite directions circumferential to the bore of the cylinder, so as to preserve corresponding relations to the piston in opposite positions of the cylinder. The outlet port is sufficiently wide to prevent trapping of outgoing liquid by the piston rollers such as would lock the motor. To prevent the cylinder in its sliding movements from jamming against the piston core 10, its lateral sliding movement in each direction is limited by shoulders shown as formed integral with the inclosing frame 6 and forming stops. Preferably a clearance space is provided, as shown, between the cylinder and casing at each extreme lateral position of the cylinder. To permit the cylinder to slide freely in the casing, openings 17 are provided leading from the outlet port 14 to the clearance spaces. To slide the cylinder to different positions in the casing, an operating rod 18 is provided, shown as screwed into the cylinder and as passing to the outside of the casing through a packing gland. The operating rod 18 is shown as manually actuatable by a hand lever 19 fulcrumed on a stationary pivot pin 20 and pivotally connected to the rod 18 by a link 21.

It is evident that when the motor-cylinder is placed at its medial position, the concentric relation of the piston and cylinder will prevent any motive liquid from passing through the motor. This medial position occurs in making the change from one position of eccentricity to the other. It is also evident that in one position of eccentricity the piston will rotate in one direction and that in the other position of eccentricity the piston will rotate in the opposite or reverse direction. Hence, the direction of operation of the motor is determined by the direction of piston and cylinder eccentricity.

The entrance or inlet 15 of each motor is connected to an incoming section of the circulating conduit 5 and the exit or outlet of each motor communicates with an outgoing section of the conduit 5. The outgoing conduit section for each motor forms the incoming section for the next motor in the series, as from A to B in Fig. 1. When the motors are all in operation the course of the power transmitting liquid would be from the delivery outlet 2 of the pump 1 by the first section of the power conduit 5 through motor A, thence through motor B, thence through any additional number of similar motors that may be included in the series, and finally by the last section of the power conduit 5 back to the intake or inlet 3 of the liquid-circulating pump 1.

To obtain different desired motor speeds, or different numbers of piston revolutions in a given interval of time, it is only necessary to vary the cross-sectional area of the path of the liquid. As the same quantity or volume of motive liquid must always pass a given point in the system in a given interval of time the variation in the cross-sectional area of the path of the liquid at any point will vary the rate of travel of the motive liquid at such point in an inverse ratio. Hence if the path of the motive liquid at the point where the liquid acts upon the piston be varied in cross-sectional area, it is evident that the speed of piston rotation will be correspondingly varied inversely. Therefore different degrees or amounts of piston eccentricity will result in producing different motor speeds, the less the eccentricity the higher the speed and the greater the eccentricity the lower the speed. As the delivery of the circulating pump 1 is constant, and consequently the quantity of motive liquid passing through each motor is also constant, the speed of the motor will always remain unaffected by the load upon the motor or the quantity of work that the motor is doing. The motive liquid is propelled through the system at a constant rate of speed regardless of its pressure.

As no motive liquid can pass through the motor when the piston and cylinder are in concentric relation and the motive liquid moves continuously, some other passageway must then be provided for such moving liquid. For this purpose a power by-pass or power shunt conduit 22 is provided and forms a communication exclusive of the motor or around the motor and between the incoming and outgoing sections of the circulating conduit 5, at each motor. As this shunt conduit must carry the entire amount of motive liquid when the motor is not operating, it is preferably as shown of the same size as the conduit 5, and of which it virtually forms a part when the motor is not running. The shunt conduit 22 is controlled by a cutoff valve 23 which may be partly rotated substantially 90 degrees in each direction from the open position or substantially 180 degrees in all. This valve is controlled by the lever 19 in such manner that when the slidable cylinder is at or near its medial position the valve 23 will be open (A, Fig. 1) and in the other or more lateral positions of the cylinder the valve 23 will be closed (Fig. 2 and at B of Fig. 1). The mechanism for thus automatically controlling the valve 23, comprises an operating pinion 24 fixed on the stem of the valve and operable by a rack 25 pivoted on the pivot pin 20 in common with the cylinder-operating lever 19. The rack 25 extends above its pivot-pin and is provided with angularly spaced valve-actuating pins 26 which project in the path of the lever 19. The rack 25 is symmetrically laterally proportioned so that it partakes of similar though opposite movements in either direction of movement of the lever 19. On account of the much larger radius of the rack 25 compared to the pinion 24, the valve 23 will be actuated to open or close very quickly when the lever 19 comes in contact with one of the valve-actuating pins 26, and this result is desirable to give a wider range of speed adjustment and prevent any choking or throttling of the motive liquid and consequent loss by friction when the motor is not in operation and all of the motive liquid is passing through the shunt conduit 22 and valve 23. The bore or passageway through the valve 23 is widened or flared as shown so that by the time the lever 19 has reached the vertical position, as when the motor is put out of operation, there will be a perfectly free and full size passageway through the valve 23 (see Fig. 1 at A). The pins 26 are spaced the proper distance apart so that the valve 23 will be actuated in each direction, for opening and for closing, at the proper times. One extreme position of the cylinder is shown in Fig. 4 and indicated in Fig. 2 by the rightward position of the lever 19, and the other extreme position of the cylinder is indicated by the leftward position of the lever 19 at B in Fig. 1. In these extreme positions of cylinder adjustment the by-pass-controlling valve 23 is closed, as seen in Fig. 2. Movement of the lever 19 between the pins 26 gives the speed regulation of the motor, the motor speed increasing as the lever is moved from an angular toward a vertical position. When the highest practicable speed provided for has been reached the lever 19 will strike that one of the valve-actuating pins 26 which is at the time in its path and will open the valve 23 and divert the flow of motive liquid through the shunt-conduit 22. When the lever 19 has moved an equal distance to the opposite side of the vertical the valve 23 will be closed by its continued movement and will remain closed during all speed adjustments for rotation of the motor in the opposite direction. To stop the motor the lever 19 is moved to a substantially vertical position. To operate the motor the lever 19 is moved far enough from the vertical to close the valve 23, the direction of motor rotation being determined by the direction from the vertical in which the lever is moved.

It should be noted that the motive liquid moves with the positiveness of a line shaft, and that the change of speed is as positive as would result from change-of-speed gears. On account of this positiveness of motion some safety means must be provided to protect the system from injury due to excessive overloads which might accidentally be thrown upon the motor, such as might occur from a tool driven thereby meeting with an obstruction, and which otherwise would result in breakage. The safety means provided comprise a safety shunt conduit or safety by-pass 27 which forms a communication between the incoming and outgoing sections of the circulating conduit 5 at each motor. The safety conduit 27 is controlled by a unidirectional safety valve 28. This safety valve opens in the direction of flow of motive liquid and is normally held upon its seat by a strong spring shown as a thrust spring 29 coiled about the stem of the valve 28 and acting between the valve-casing and a hand-nut 30 threaded on the valve-stem as shown for adjusting the tension of the spring 29. The safety valve remains closed except under a strain or pressure that would be dangerous to the safety of the apparatus, in which case it will be forced open against the tension of its spring and will allow the motive liquid to pass around the motor, to prevent breakage. The tension of the valve-closing spring 29 is such as to maintain the safety valve closed at all times until a predetermined danger point is attained, and this point may be determined within certain limits by adjusting the tension of the spring 29. It should be noted also that the above described arrangement of safety bypass 27 and safety valve 28 prevents the accidental clogging or stopping of one of the motors in the series from interfering with the operation of the other motors, as the driving liquid or motive liquid may then flow through such safety bypass until the obstructed or disabled motor can be cut out of the circulatory system by means of its lever 19.

It is obvious that various modifications may be made in the construction shown and above particularly described within the principle and scope of my invention.

I claim:—

1. A hydraulic power transmission system comprising a plurality of pressure-actuated hydraulic motors and a constant delivery pump all connected together in a hydraulic circulatory system in series relation with each other for forcing motive liquid through each of the motors in constant quantities for any given interval of time, whereby each motor will operate at a constant speed regardless of its load.

2. A hydraulic power transmission system comprising a plurality of pressure-actuated hydraulic motors and a constant delivery pump all connected together in a hydraulic circulatory system in series relation with each other for forcing motive liquid through each of the motors in constant quantities for any given interval of time, and a pressure-controlled safety-bypass around each motor for the motive liquid to pass through in case of excessive overload on the motor.

3. A hydraulic power transmission system comprising a plurality of hydraulic motors and a constant delivery pump all connected together in a hydraulic circulatory system in series relation with each other for forcing motive liquid through each of the motors in constant quantities for any given interval of time, and means for each motor actuated concurrently with the shutting down of the motor for opening a passage around the motor for the motive liquid so that any motor may be shut down without shutting down the pump, whereby the motors may be operated independently of each other.

4. A hydraulic power transmission system comprising a plurality of hydraulic motors and a constant delivery pump all connected together in a hydraulic circulatory system in series relation with each other for forcing motive liquid through each of the motors in constant quantities for any given interval of time, each motor including means for changing the liquid consuming capacity of the motor per cycle of operation, whereby the speed of motor operation may be changed while the volume of motive liquid passing through the motor in a given interval of time remains the same.

5. A hydraulic power transmission system comprising a circulating conduit for a hydraulic circulatory system, a plurality of hydraulic motors hydraulically connected in the system in series relation with each other, means for circulating a power transmitting liquid in the conduit at a substantially constant rate of movement at any given point for compelling each motor to operate at a constant speed regardless of the amount of its load, each motor including means for varying the capacity of the motor as to volume of motive liquid consumed per cycle, and a manual device for controlling the last-named means to change the speed of operation of the motor.

6. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point for compelling each motor to operate at a constant speed regardless of its load within the limits of its capacity, each motor including means for reversing its direction of operation, and a single manual device for each motor adapted by a single movement to determine the operation and direction of operation and to change the speed of operation of the motor, the motor being constructed and arranged to coöperate with said device.

7. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point, a shunt conduit for each motor communicating with the circulating conduit around the motor, a cut-off valve in control of the shunt conduit, means for determining the operation and non-operation of the motor, and mechanism controlled thereby for opening the valve when the motor is not in operation and for closing the valve when the motor is to be operated.

8. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point, a safety conduit for each motor communicating with the circulating conduit around the motor, a unidirectional safety valve in control of the safety conduit adapted to open in the direction of motive liquid pressure, and resisting means opposing the opening of the safety valve.

9. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point, a safety conduit for each motor communicating with the circulating conduit around the motor, a unidirectional safety valve in control of the safety conduit adapted to open in the direction of motive liquid pressure, resilient resisting means opposed to the opening of the safety valve, and means for adjusting the strength of the resisting means.

10. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point, each motor including a rotary piston, a casing, a cylinder for the piston slidable in the casing transversely to the axis of the piston so as to give different amounts of piston eccentricity in either one of two opposite directions, a manual device for sliding the cylinder to eccentrical relations with the piston, a shunt conduit for each motor communicating with the circulating conduit around the motor, a cut-off valve in control of the shunt conduit, and mechanism controlled by the manual device for opening the valve when the cylinder is within a predetermined distance of its concentric position and for closing the valve when the cylinder is at more eccentric points.

11. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point, each motor including a rotary piston, a casing, a cylinder for the piston slidable in the casing transversely to the axis of the piston so as to give different amounts of piston eccentricity in either one of two opposite directions, a manual device for sliding the cylinder to eccentrical relations with the piston, a shunt conduit for each motor communicating with the circulating conduit around the motor, a cut-off valve in control of the shunt conduit, mechanism controlled by the manual device for opening the valve when the cylinder is within a predetermined distance of its concentric position and for closing the valve when the cylinder is at more eccentric points, a safety conduit for each motor communicating with the circulating conduit around the motor, a safety valve in control of the safety conduit adapted to open in the direction of motive liquid pressure, and resilient resisting means opposing the opening of the safety valve.

12. A hydraulic power transmission system comprising a plurality of hydraulic motors and a constant delivery pump all connected together in a hydraulic circulatory system in series relation one with another for forcing motive liquid through each of the motors in constant quantities for any given interval of time, each motor including means for changing the liquid consuming capacity of the motor per cycle of operation of the motor, means for each motor actuated concurrently with the shutting down of the motor for opening a passage around the motor for the motive liquid, and a pressure-controlled safety bypass around each motor for the motive liquid.

13. A hydraulic power transmission system comprising a plurality of hydraulic motors and a constant delivery pump all connected together in a hydraulic circulatory system in series relation one with another for forcing motive liquid through each of the motors in constant quantities for any given interval of time, means for each motor actuated concurrently with the shutting down of the motor for opening a passage around the motor for the motive liquid, and a pressure-controlled safety bypass around each motor for the motive liquid.

14. A hydraulic power transmission system comprising a circulating conduit for a hydraulic circulatory system, a plurality of hydraulic motors hydraulically connected in the system in series relation with each other, means for circulating a power transmitting liquid in the conduit and through the motors at a substantially constant rate of movement at any given point, a shunt conduit for each motor communicating with the circulating conduit around the motor, a cut-off valve in control of the shunt conduit, means for determining the operation and non-operation of the motor, mechanism controlled thereby for opening the valve when the motor is not in operation and for closing the valve when the motor is to be operated, a safety conduit for each motor communicating with the circulating conduit around the motor, a safety valve in control of the safety conduit adapted to open in the direction of motive liquid pressure, and adjustable resisting means opposing the opening of the safety valve.

In testimony whereof I have affixed my signature in presence of two witnesses.

ALBERT V. T. DAY.

Witnesses:
WM. ASHLEY KELLY,
BERNARD COWEN.